United States Patent
Bartsch et al.

[11] Patent Number: 5,958,178
[45] Date of Patent: Sep. 28, 1999

[54] VISUAL LAMINATION WITH THERMOPLASTIC ADHESIVES

[75] Inventors: Peter Bartsch, Burgthann-Unterferrieden; Hans-Josef Mueller, Amberg, both of Germany

[73] Assignee: Billhoefer Maschinenfabrik GmbH, Nuernberg, Germany

[21] Appl. No.: 08/758,712

[22] Filed: Dec. 2, 1996

[30] Foreign Application Priority Data

Dec. 12, 1995 [DE] Germany .................. 195 46 272

[51] Int. Cl.⁶ .................. B32B 31/12; B05B 01/04
[52] U.S. Cl. .................. 156/543; 118/325; 118/413; 118/419; 156/324; 156/578
[58] Field of Search .................. 156/324, 229, 156/242, 244.11, 184.543, 499.578, 500, 459, 494, 495, 496, 322, 244.27; 264/172, 19; 118/33, 34, 672, 680, 679, 304, 313, 315, 324, 325, 401, 402, 410, 413, 419; 425/66, 466

[56] References Cited

U.S. PATENT DOCUMENTS

| | | |
|---|---|---|
| 2,766,717 | 10/1956 | Neidich et al. .................. 118/33 |
| 2,774,327 | 12/1956 | Saint-Hilaire .................. 118/33 |
| 3,241,429 | 3/1966 | Rice et al. .................. 156/242 X |
| 3,607,544 | 9/1971 | Earner et al. .................. 156/308.6 |
| 3,669,794 | 6/1972 | Mazur .................. 156/244.27 |
| 3,684,422 | 8/1972 | Huesing .................. 425/466 |
| 3,867,900 | 2/1975 | Van Osterhout et al. .................. 118/33 |
| 4,070,222 | 1/1978 | Olson .................. 156/251 |
| 4,562,023 | 12/1985 | Pabst et al. .................. 264/75 |
| 4,685,770 | 8/1987 | Baeger .................. 156/292 X |
| 4,746,545 | 5/1988 | McIntyre .................. 118/33 X |

Primary Examiner—Francis J. Lorin
Attorney, Agent, or Firm—Jordan and Hamburg LLP

[57] ABSTRACT

A visual lamination for the purpose of finishing the surface of printed and other products by applying laminating films by means of a 100% adhesive system, for which the adhesive-coated laminating film is laminated with a heated laminating roller onto the product, a thermoplastic adhesive being applied immediately in front of the laminating roller on the laminating film by means of a fishtail nozzle, and an apparatus for producing such a visual coating.

27 Claims, 6 Drawing Sheets

VISUAL LAMINATION WITH THERMOPLASTIC ADHESIVES

BACKGROUND OF THE INVENTION

The invention relates to a visual lamination for the purpose of finishing the surface of printed and other products by applying laminating films by means of a 100% adhesive system, for which the adhesive-coated laminating film is laminated with a heated laminating roller onto the product, as well as to an apparatus for producing such a visual coating.

A plurality of different systems for applying a visual lamination, which have more or less gained acceptance in practice, are already known. Aside from the use of solvent-containing film laminating adhesives, for which the adhesive is applied on the laminating film or on the product to be laminated by means of a dipping roller with a doctor blade system, dispersion film-laminating adhesives, which are likewise processed wet, have also already been used. Both systems have no or, at best, limited prospects in the future, since solvent-containing adhesives will be banned completely in the foreseeable future for environmental reasons and dispersion film-laminating adhesives, although they comply with the waste air regulations of the EU, nevertheless have the disadvantage that they require higher amounts to be applied, that certain processing problems arise, that there are difficulties with printing certain materials and that, aside from a higher energy consumption, particularly longer cleaning times are required in order to prepare a laminating machine for use once again after it has been stopped.

Furthermore, so-called solventless film laminating adhesives have also already been used, mostly in the form of liquid polyurethanes, which are activated by moisture from the air or from the material being printed. Further processing directly subsequently is not possible, since the reaction between the adhesive and the moisture is not concluded immediately after the laminating process. However, because of the isocyanates they contain, such adhesives are harmful to the environment and the products treated therewith must be disposed of as hazardous waste. Furthermore, the adhesive, after being activated by moisture from air, always becomes a solid, so that an increased cleaning expenditure becomes necessary. The advantage of such solventless film laminating adhesives, namely that the adhesive is a 100% system, that is, that no solvents, in addition to the original adhesive, are used and only a small amount needs to be applied and that furthermore a high gloss can be achieved, cannot be utilized satisfactorily because of the disadvantages.

Correspondingly the same also applies to the UV-curing film-laminating adhesives, which once again are 100% systems. Such UV-curing adhesives can be processed with the application of small amounts and without losses and make high belt speeds possible. However, UV-processing machines must be cleaned very carefully and provided with protective devices, which are opaque to UV light, since remaining residues of adhesive could otherwise polymerize fully and thus lead to protracted cleaning of parts of the equipment. It is, however, a disadvantage of such UV-curing adhesives for visual laminations with the help of laminating films that, on the one hand, they are not permitted for primary food packages, that there is always a certain, residual odor, which is very disturbing or totally impermissible in many cases, that there are problems with certain printed goods and that more controls are required (UV radiator, curing, printed goods, etc.).

A laminating system, which is used particularly frequently, is one for which thermofilms are employed for the lamination. In this case, the films are provided with an adhesive coating already by the manufacturer. It is merely necessary to bring together the coated films with the printed material to be laminated or the like, in order to attain the lamination with a heated calender roller. This means that the necessary investment in machinery is small and that it is necessary to store, dispose of or apply the adhesive. As a result, the preparation times are shorter, the cleaning problems are less and the laminated products can be processed further immediately.

The disadvantage of such thermofilm lamination consists of having to keep stocks of several types of film in all widths, poor heat stability and tear-off difficulties. Aside from edge-trimmings waste, which causes appreciable costs because of the expensive thermofilms, there is the difficulty that, when the paper is laid flat, the paper material must be broken over a knife, as a result of which problems arise with the reverse side. Furthermore, with many film rolls, a fold is formed at the edges and it has so far been impossible to eliminate the cause of this fold. Finally, the very high price is a particular disadvantage.

SUMMARY OF THE INVENTION

It is therefore an object of the invention to provide a visual lamination, which is easy to process and inexpensive and combines a high stability under load with optimum gloss properties, permits immediate further processing and, furthermore, requires very little cleaning work.

Pursuant to the invention, this objective is accomplished owing to the fact that, immediately in front of the laminating roller, a thermoplastic adhesive is applied on the laminating film by means of a heated fishtail nozzle, the adhesive film, before it reaches the fishtail nozzle, preferably being cooled or, in particular, being heated to a specifiable temperature.

Especially in conjunction with the heated fishtail nozzle, the inventive lamination using thermoplastic adhesives enables clearly defined amounts of 0.5 to 20 $g/m^2$ to be applied. There are practically no fluctuations in the specified amounts applied when the production speed is changed or the viscosity of the adhesive fluctuates.

In this connection, the nature of the apparatus, with which the visual lamination is achieved, is of particular importance and, in a further development of the invention, is characterized in that a fishtail nozzle, which is connected in a known manner via a heatable supply hose with an adhesive container with a melting device and has a nozzle antechamber with metering pumps, is mounted between a heatable or coolable sheet offtake calender with a counter-pressure roller and a preferably rubber-coated feed roller, between which the laminating film is held at a tensile stress, which can be adjusted independently of the takeoff tension by a supply roller, touches on the laminating film, preferably dipping in with slight looping.

The contact between the fishtail nozzle and the laminating film, the fishtail nozzle preferably being fixable at and pivotable about the outlet opening of the adhesive, can be brought about in various ways. On the one hand, it is possible that the fishtail nozzle is in contact with the laminating film between two closely adjacent, easily running counter-pressure rollers. By varying the contacting pressure, the extent of the desired looping and, with that, the amount of adhesive applied, can be changed. Alternatively, provisions can also be made so that the fishtail nozzle rests on the laminating film on a solid support with a flexible covering, the restoring force of the support resulting in a uniform contact between the nozzle outlet opening and the film over the whole width of the latter.

The advantage of the inventive laminating method is developed to the full extent if the fishtail nozzle is a segmented fishtail nozzle with width disconnection, the amount of adhesive applied being controllable absolutely.

The feed roller can be driven synchronously. Preferably, however, it is driven with a lead of 3 to 10% relative to the film takeoff calender, in order to ensure, by means of a control device with a sheet tension measurement roller, that the film tension is constant under the application device.

In a development of the invention, provisions can be made so that a transverse stretching roller, into which a sheet tension measurement roller can be integrated, is disposed between the feed roller and the laminating roller. Such a sheet tension measurement roller can, however, also be disposed separately in front of the transverse stretching roller.

A particularly advantageous type of driving, which makes an appropriate control possible even when the speed of the film sheet is changing, arises in accordance with a further distinguishing feature of the invention owing to the fact that the film takeoff calender is driven over an overlap gearing, driven by the laminating roller, with preferably an AC servo motor or with a different driving system of corresponding control accuracy according to a pre-adjustable sheet tension of the laminating film. It is thus ensured that a desired sheet tension between the takeoff roller and the laminating roller, once entered, remains constant independently of the operating speed and the other parameters having an effect.

Finally, aside from the further possibility of connecting the film takeoff calender in series with a transverse stretching roller, inclinable film-guiding rollers can also be disposed between the delivery roll, on which the laminating film is delivered, and the takeoff calender or the transverse stretching roller, with which the takeoff calender is connected in series.

Further advantages, distinguishing features and details of the invention arise out of the following description of an example shown in the accompanying drawing.

DETAILED DESCRIPTION OF THE PRESENT INVENTION

Figure 1:
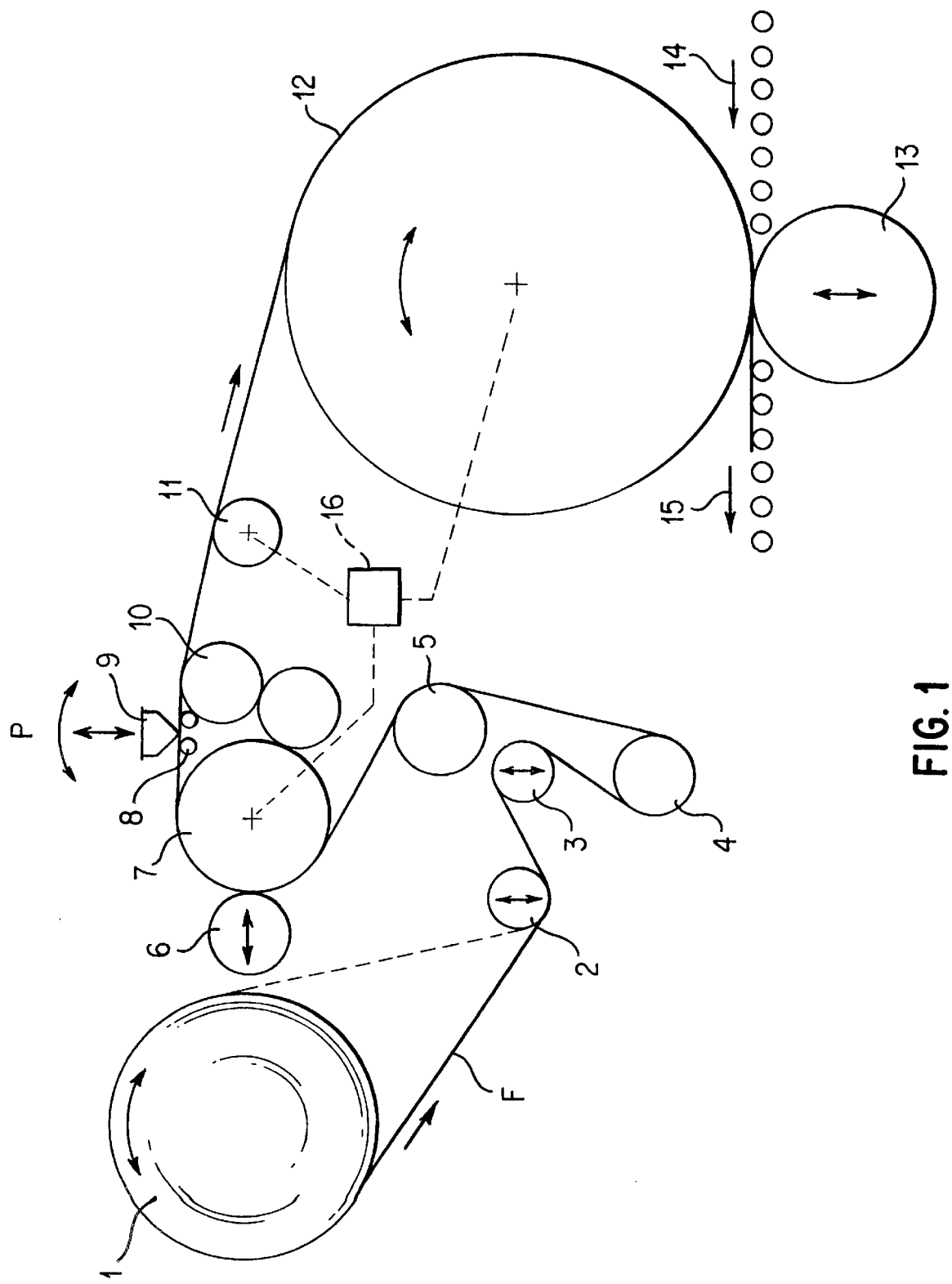
FIG. 1 is a diagrammatic view showing a section through a visual laminating apparatus according to one embodiment of the invention.

A delivery or supply roll 1 is suspended in a film-unwinding mechanism in such a manner, that a pre-treated film side (pre-treatment provided by the manufacturer) during coating points to application equipment. Tension on the film F sheet is kept constant by means of a brake. Film guiding rollers are indicated at 2 and 3, the film-guiding roller 2 preferably being inclined at operator side of the machine and the film-guiding roller 3 at an opposite side of the machine. The winding errors of the film rolls (wound concavely, convexly or inclined to one side) can be compensated for by the adjustment of the guiding rollers 2 and 3 and, as the film sheet F is guided to the machine, a tension relationships are the same over the whole width. The laminating film F, taken off, passes over a film-guiding roller 4 and reaches a transverse stretching roller 5, which ensures that the film sheet F winds onto a takeoff calender without folds.

The takeoff calender includes a takeoff roller 7, the temperature of which can be controlled, and a rubber-coated counter-pressure roller 6, which can be turned on and off and the contacting pressure of which against the takeoff roller 7 can be varied. Depending on the type of film, the takeoff roller 7 can be cooled or heated in order to counteract fold formation under the application equipment. As a rule, however, the takeoff roller 7 is heated, in order to pre-heat the film sheet F, which is stably passed over it, to a temperature of the glue without tension. The takeoff calender causes the film sheet F to be taken off and transported from the film-unwinding system to the application equipment under a constant tension so as to run into guiding rollers 8 of the film stabilization system shown without folds.

In the example shown, this film stabilization system includes the two easily running guiding rollers 8, which are disposed at a minimum distance from one another. The guiding rollers 8 bring about a stiffening of the film sheet F, which is passed under a fishtail nozzle 9 of the application equipment. In this region, the stress relationships in the film F are kept constant over the whole width of the sheet by upstream and downstream equipment. Depending on the type of film and adhesive and on the shape of the nozzle 9, the application nozzle 9 can touch the film sheet F or dip between the guiding rollers 8, in order to bring about a looping of the nozzle 9.

The adhesive application equipment, which is known and therefore not shown in detail, consists of the following components:

a) an adhesive container with melting equipment
b) a heatable feeding hose
c) a nozzle antechamber with metering pumps (forced feed)
d) a segmented fishtail nozzle 9 with width disconnection
e) controlling electronics Melted adhesive is delivered by means of a feed pump over the heated hose to metering pumps, so that a delivery space of the metering pumps is always filled with adhesive and free of bubbles. The metering pumps deliver a defined amount of adhesive in to the distributing system of the nozzle antechamber. From there, the adhesive reaches segments of the fishtail nozzle 9, assigned to the respective metering pump and, at the outlet opening of the nozzle 9, is painted on the film sheet F. Excess adhesive, delivered by decreasing the maximum operating width, is returned to the tank, so that stationary nests of adhesive, in which the adhesive could be damaged thermally, are not formed. In all the components a–d, the adhesive is heated to the ideal processing temperature and the temperature is monitored constantly. Likewise, it is possible to adjust the temperature to different values in the individual components a–d. The application nozzle 9 swiveled about an outlet opening of the adhesive (double arrow P), in order to adjust a painting angle relative to the film sheet F to an optimum value. The amount to be applied (g/m$^2$) is entered as an absolute value into the control system and remains constant during the whole of the production, even if there are changes in speed.

A rubberized feed roller 10 is disposed so that it is easily looped by the film F. It is driven and runs synchronously with the takeoff calender 6, 7. However, it can also be changed to lead (3 to 10% relative to 7). It acts in collaboration with a laminating roller 12 and a sheet tension measuring roller 11 and, as a consequence, keeps a constant film tension under the application nozzle 9.

The transverse stretching roller 11 ensures that the film sheet runs onto the laminating roller 12 without folds. At the same time, a sheet tension measurement device, integrated into the transverse stretching roller 11, controls driving of a drive system 16 having preferably an AC servo motor or of a different driving system of corresponding control accuracy at an overlap gearing, which drives the takeoff roller 7. The overlap gearing itself is driven by the laminating roller 12. Accordingly, it is ensured that a desired sheet tension between the takeoff roller 7 and the laminating roller 12, once entered, remains constant independently of the operating speed and other influencing variables.

The laminating roller 12 is heated infinitely variably from 20° C. to 140° C. The temperature required is determined by the ideal adhesive processing temperatures. As the adhesive-coated film sheet F runs onto the laminating roller 12, the adhesive, which is applied as a closed film, is melted and laminated with a counter-force of a counter-pressure roller onto incoming paper. The diameter is between 200 and 450 mm, depending on the type of machine and the operating speed.

The rubberized counter-pressure roller 13 is pressed by means of hydraulic equipment with a force of 5,000 to 60,000 N against the laminating roller 12. At the same time, a "nip surface" is formed, which leads to a longer contact time of the material, which is to be laminated and which is brought along in the direction of arrow 14, in the form of a sheet or of individual stream-fed sheets. By these means, good adhesion between paper and film F is achieved. Furthermore, slight corrugations in the adhesive applied are smoothed. The result is a high gloss lamination without squeezing of the adhesive. The laminated material is transported away along arrow 15.

Figure 2:
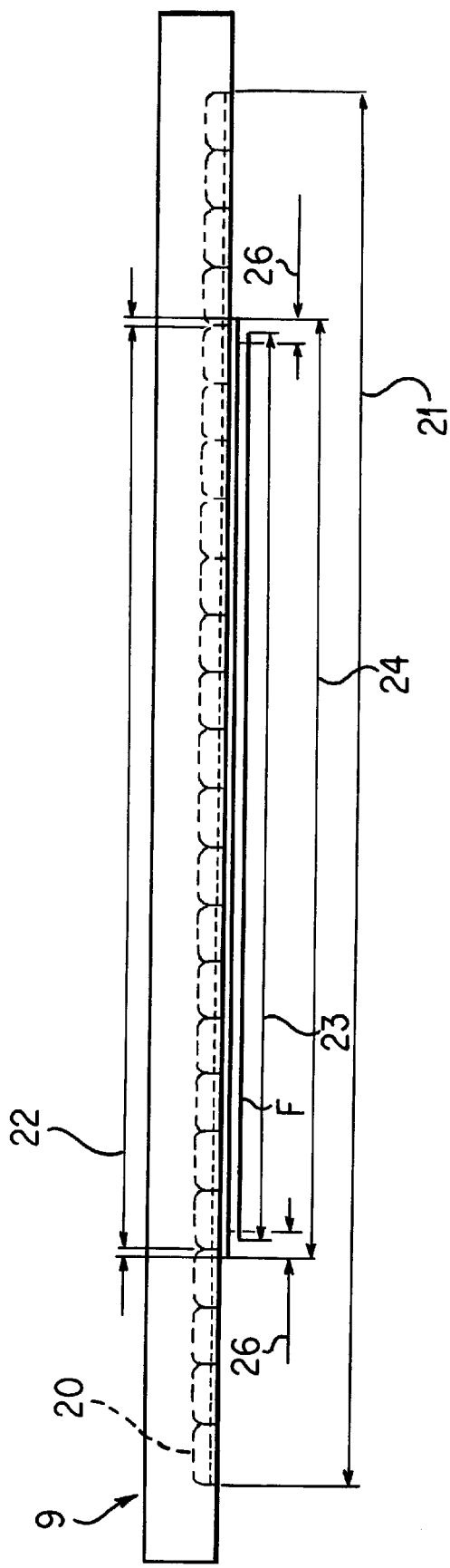
FIG. 2 is a partial schematic elevational view showing the plurality of segments of the fishtail nozzle.

FIG. 2 shows the fishtail nozzle 9 indicating its total width of application and showing a plurality of individual segments 20 which make up the fishtail nozzle 9. These segments 20 can be alternately switched on or off manually or automatically in such a manner, that the sum of the activated individual segments 20 results in the desired width of application of the adhesive. The width of application of adhesive is selected so that it is wider than the incoming sheet of material which is to be laminated, and the excess coating of adhesive on each side is trimmed laterally before the laminating process.

A maximum application width of the fishtail nozzle 9 is indicated by the numeral 21 in FIG. 2. A selected application width is indicated at 22. Thus the example in FIG. 2 shows 24 segments 20 but the outer four on either side are switched off while the middle 16 are switched on to apply the adhesive on to the film F. The width of the film F is indicated at 23. After the adhesive is applied, the width 23 of the film F and the lateral projecting width of the adhesive has a width indicated by the numeral 24. However, the lateral sides of the adhesive are trimmed by an amount indicated by the numeral 26 in FIG. 2 such that the film F is about 5 mm wider on the left and right sides than the applied adhesive. In FIG. 2, both edges are shown trimmed. However, the nozzle 9 can be adjusted so that trimming is required on only one edge of the film F.

Figure 3:
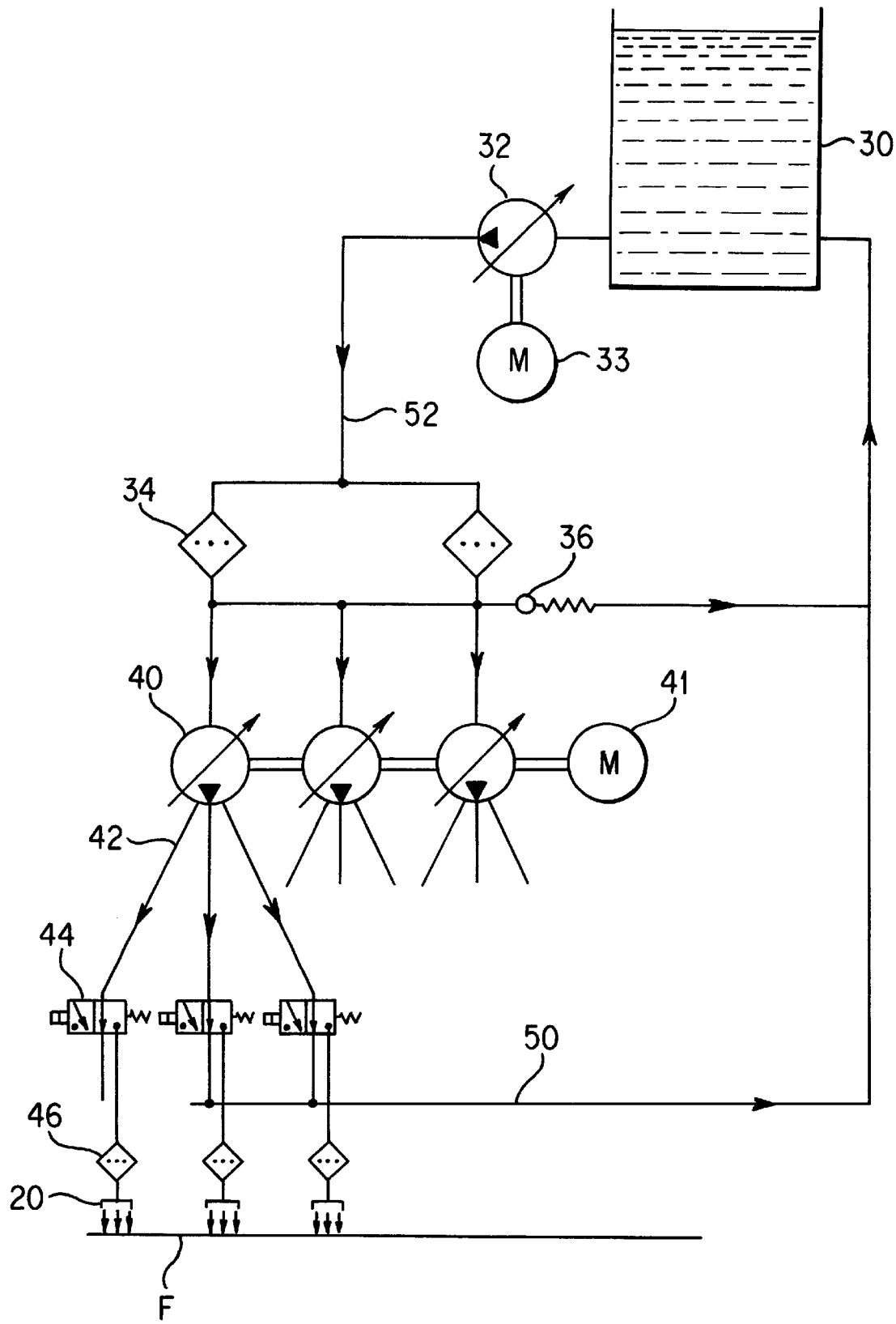
FIG. 3 is a schematic view showing the delivery apparatus for delivering the adhesive to the film to be coated.

FIG. 3 shows a tank 30 in which the adhesive is heated over several heating zones and thus adjusted to a desired viscosity. A controllable supply pump 32 driven by a motor 33 delivers the adhesive via a conduit 52 to preliminary filters 34 and conduits 38 into the multiple metering pumps 40, excess amount of adhesive being conducted back via a bypass valve 36 into the tank 30. The metering pump 40 delivers an adjustable and metered amount of liquid adhesive and this delivered adhesive is conducted via a conduit 42 to control valves 44. The control valves 44 have a switched-off position in which the control valves deliver the adhesive back to the tank 30 via a return line 50 and a switched-on position which delivers the adhesive through filters 46 to the nozzle segments 20 from which the adhesive is applied to the film F.

Each control valve 44 can be manually switched on and off or automatically switched on and off by a motor 41 and in this way, the desired width of application of the adhesive to be applied is obtained. The control valves 44 controlling the four outer segments 20 on either side of the fishtail nozzle 9 in FIG. 2 are switched off while the middle sixteen segments 22 are switched on. Thus it will be seen that with this disclosed arrangement, any desired application width can be obtained by switching on or off the desired control valves 40 which control each segment 20.

One metering pump 40 may be provided for several segments 20. For example, in the illustrated embodiment, three metering pumps 40 are shown and each metering pump 40 discharges via the conduits 42 to eight control valves 44. In this regard, any desired combination of metering pumps and control valves may be used.

Figure 4:
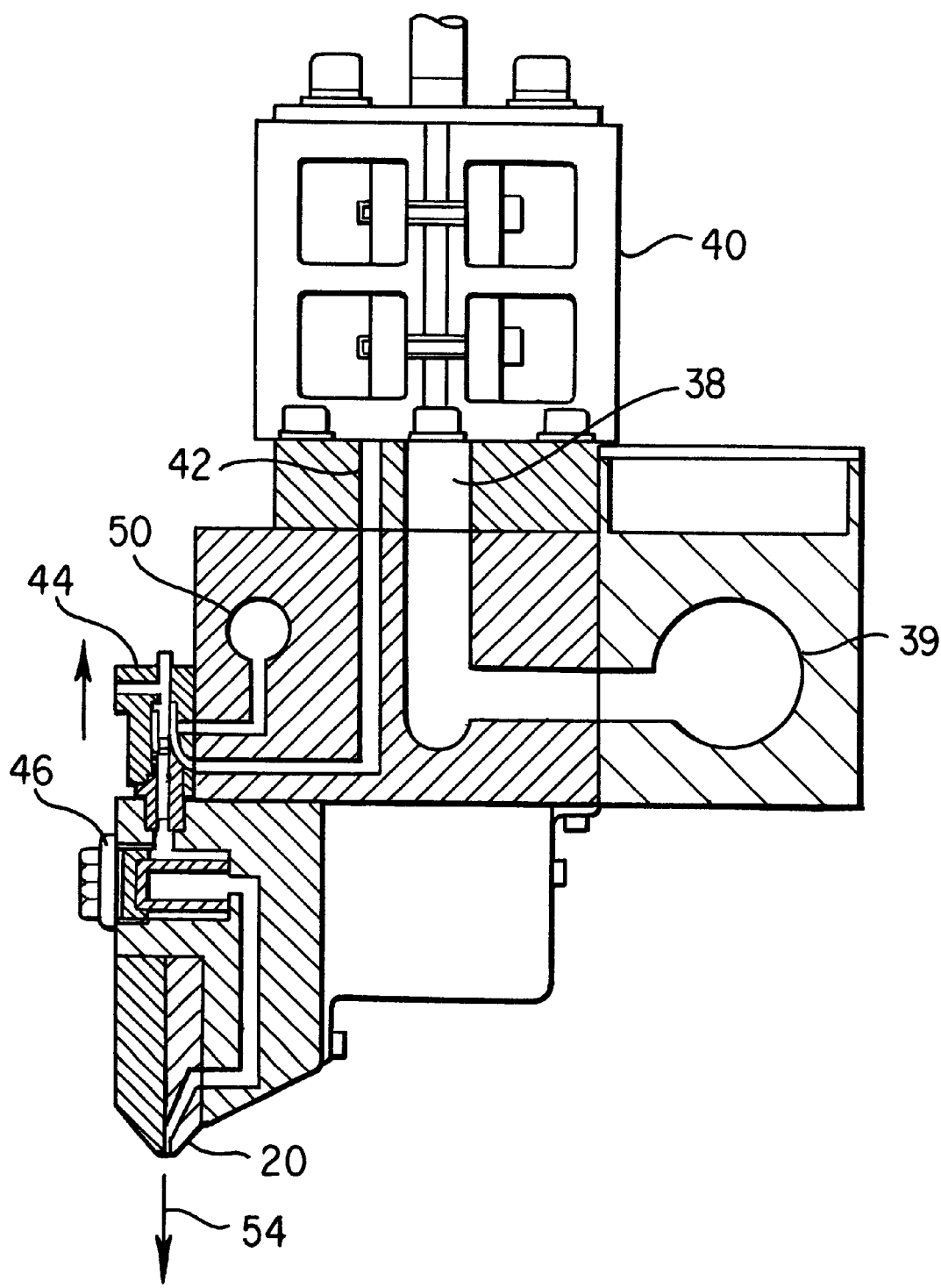
FIG. 4 is a cross-sectional view of the fishtail nozzle and the metering pump showing the valve in an open position.

FIG. 4 is a cross section of the fishtail nozzle 9 showing the metering pump 40, a metering pump inlet 38, a metering pump outlet 42, the control valve 44, the filter 46 and the segment 20. The adhesive is delivered from the supply pump 32 via conduit 39 to the inlet 38. FIG. 4 also shows the return conduit 50.

FIG. 4 shows the control valve 44 in a switched-on position such that the metering pump 40 delivers the adhesive through the open control valve 44, the filter 46 and the segment 20 which delivers the adhesive, as indicated by the arrow 54 in FIG. 4 to the film F.

Figure 5:
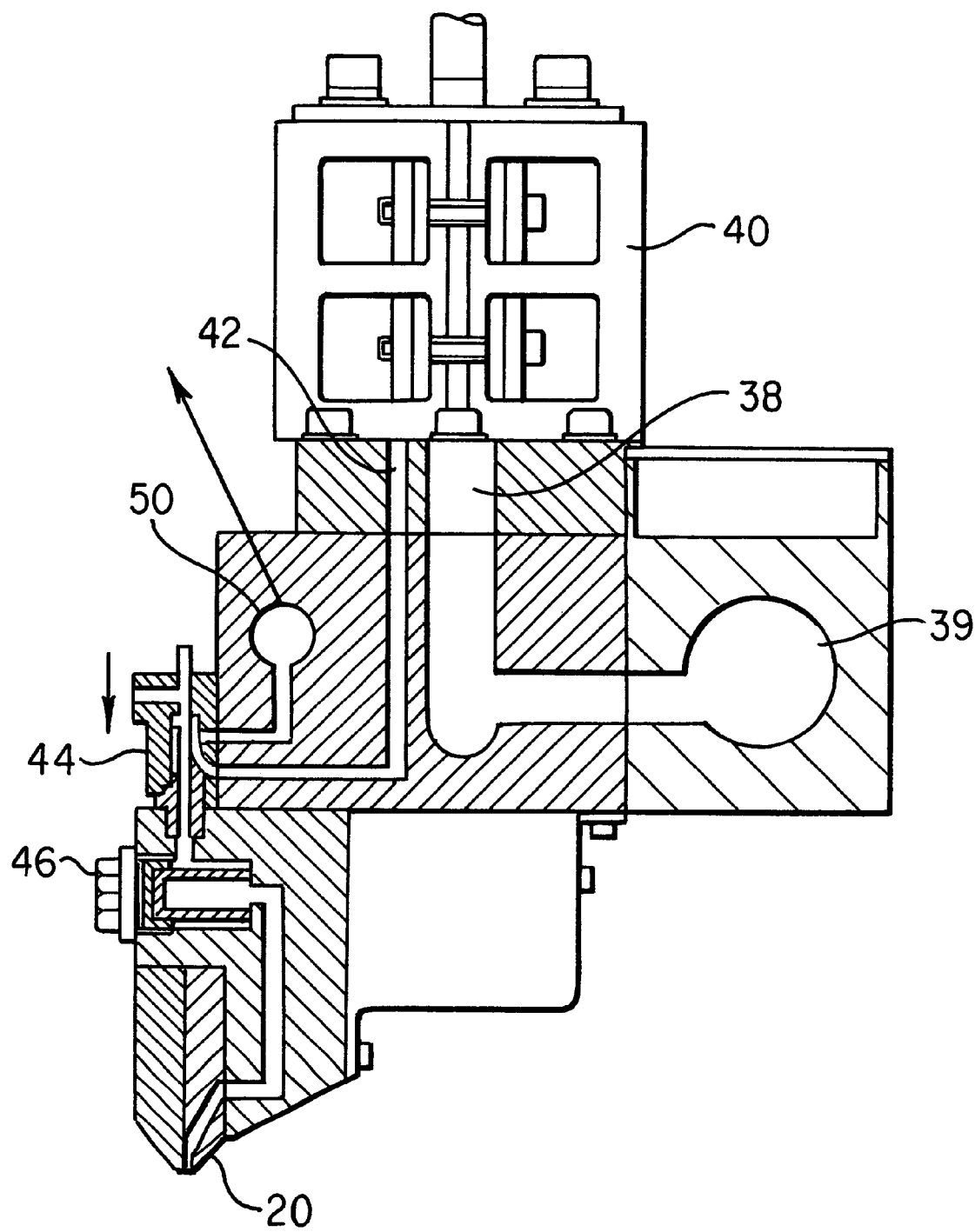
FIG. 5 is a view similar to FIG. 4 but showing the valve in a closed position.

FIG. 5 is a view similar to FIG. 4 but shows the control valve 44 in a switched-off position such that the adhesive is no longer delivered to the segment 20 but rather is returned to the tank 30 via the return line 50.

Although the illustrated embodiment shows twenty-four segments 20 and three metering pumps 40, any number of segments and any number of metering pumps or any combination thereof may be used as desired.

Figure 6:
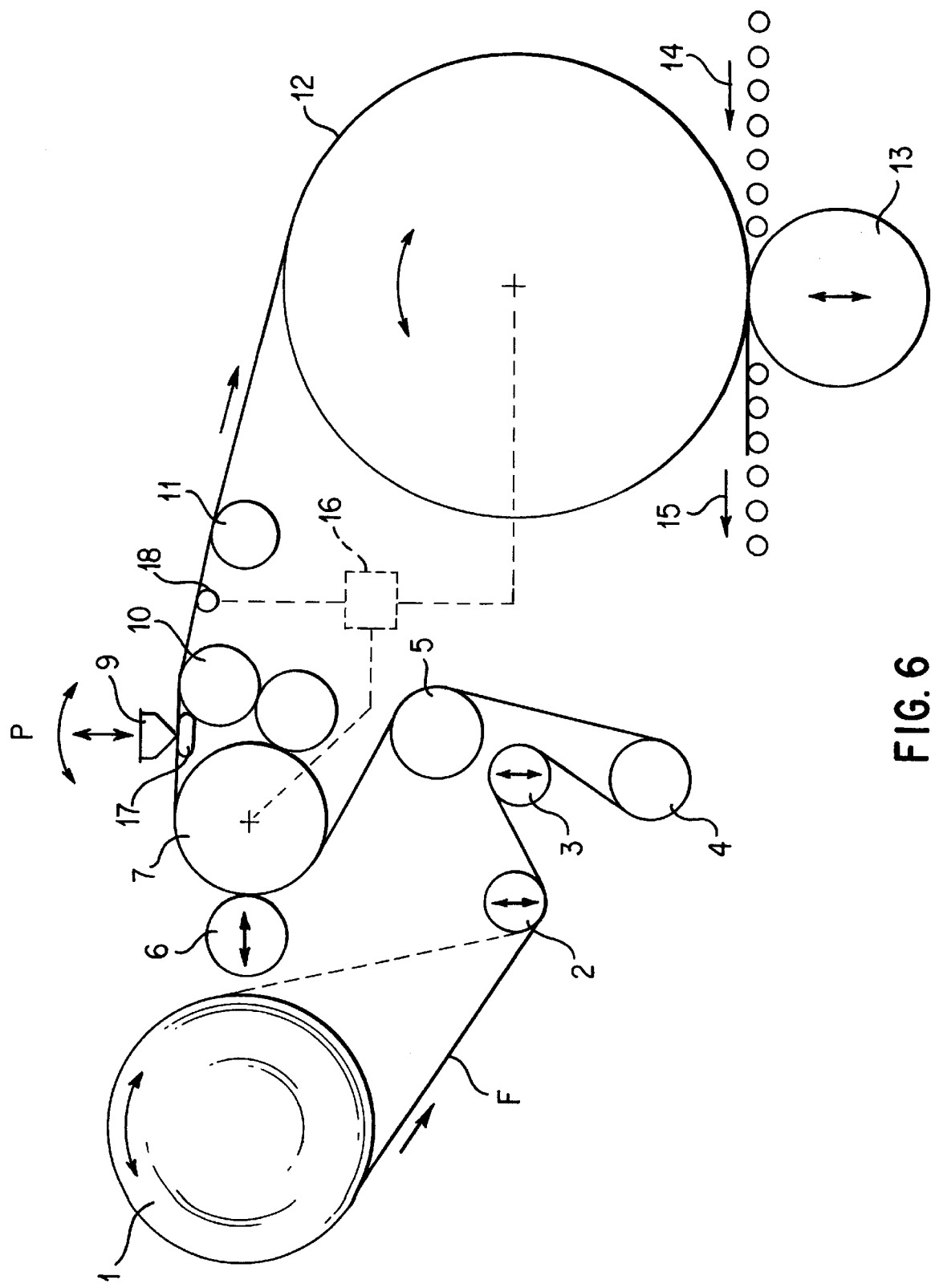
FIG. 6 is a view similar to FIG. 1 but showing an alternate embodiment in which a separate sheet tension measuring roller is disposed ahead of the transverse stretching roller and also showing the fishtail nozzle pressing the film sheet onto a flexible substrate.

FIG. 6 is a view similar to FIG. 1 but shows an alternative embodiment. In FIG. 6, the film F under the fishtail nozzle 9 9 could also be stabilized by providing a solid support 17 with a flexible coating, in which case the fishtail nozzle 9 presses the film sheet F at least onto the flexible substrate 17. The restoring force of the substrate 17 provides a uniform contact between the film F and the outlet opening of the nozzle 9 over the whole width of the film sheet F.

Instead of providing the sheet tension measuring device integrated with the transverse stretching roller 11, the sheet tensioning is measured with a separate measuring roller 18, as shown in FIG. 6, disposed ahead of the transverse stretching roller 11. FIG. 6 also shows the drive system 16 which includes an AC servomotor or other driving system which provides the desired sheet tension between the take-off roller 7 and the laminating roller 12 as previously described.

The inventive laminating process results in the following advantages:

1) Clearly defined amounts, varying from 0.5 to 20 g/m$^2$, are applied;
2) No fluctuations in the specified amounts applied, when the production rate is changed or the viscosity of the adhesive fluctuates;
3) No waste air mixed with solvents;
4) Little energy required;
5) Product can be processed further immediately (cutting/embossing/corrugating, etc.);
6) Extreme initial adhesion of the composite;
7) Low cleaning costs for the application equipment (only the heating and pump have to be switched on and off); In association with low losses of adhesive (since the adhesive in the system can be reacted) (only the heating and pump have to be switched on and off);
1) No problems with disposing of adhesive residues;
2) The laminating quality is defined (gloss);
3) Absolute transparency of the adhesive layer;
4) All types of film presently on the market can be used.

The following types of film can be used: OPP film, polyester film, acetate film, polyethylene film, textured film or nylon film. Furthermore, without modifying the equipment, paper, textile and other material sheets, for example, can be glued equally well, provided that, in each case, appropriate, suitable adhesives are used. The adhesives used are thermoplastic adhesives, the processing temperature of which preferably lies between 90° C. and 120° C. After the laminating process, this adhesive is cured completely and has no residual tack.

What is claimed is:

1. An apparatus for applying a laminate film to a moving sheet to form a laminated sheet, the apparatus comprising:
   a heated laminating roller;
   said laminate film having first and second surfaces; a first transport mechanism transporting said laminate film to said heated laminating roller such that said first surface of said laminate film contacts said heated laminating roller and said laminate film is carried on said laminating roller;
   a heated fishtail nozzle, disposed upstream of said heated laminating roller, for applying an adhesive onto said second surface of said laminate film to form an adhesive film on said laminate film prior to said transport means passing said laminate film onto said heated laminating roller; and
   a second transport mechanism transporting said moving sheet into engagement with said adhesive layer of said laminate film carried on said heated laminating roller to effect lamination of said laminate film to said moving sheet via said adhesive film to form said laminated sheet.

2. The apparatus according to claim 1 wherein said adhesive film is 100% thermoplastic adhesive and said moving sheet is a printed sheet.

3. The apparatus according to claim 1 further comprising means for heating said laminate film prior to applying said adhesive film to said moving sheet.

4. The apparatus according to claim 1 further comprising means for cooling said laminate film prior to applying said adhesive film to said laminate film.

5. The apparatus according to claim 1 further comprising supply means for supplying said adhesive to said fishtail nozzle, said supply means including an adhesive container with melting means for melting the adhesive and a supply conduit for supplying said adhesive in melted form from said container to said fishtail nozzle.

6. The apparatus according to claim 5 wherein said fishtail nozzle has outlet openings for applying the adhesive onto said laminate film, said fishtail nozzle also including a nozzle antechamber having metering pumps for metering an amount of adhesive delivered to said outlet openings.

7. The apparatus according to claim 1 wherein said fishtail nozzle has a plurality of segments along its width and means for selectively closing off said segments to thereby control a width of the adhesive film applied to said laminate film.

8. The apparatus according to claim 1 further comprising means for pivoting said fishtail nozzle 9 about an axis extending generally perpendicular to a moving direction of said sheet.

9. The apparatus according to claim 1 wherein said first transport mechanism includes a take-off roller means including a take-off roller and a counter-pressure roller juxtaposed to said take-off roller, said take-off roller means being disposed upstream of said fishtail nozzle, said laminate film passing between said take-off roller and said counter-pressure roller, a feed roller disposed downstream of said fishtail nozzle and upstream of said heated laminating roller, said laminate film being maintained under tensile stress between said take-off means and said feed roller.

10. The apparatus according to claim 9 wherein said take-off roller includes means for heating said laminate film.

11. The apparatus according to claim 9 wherein said take-off roller includes means for cooling said laminate film.

12. The apparatus according to claim 9 wherein said feed roller has a rubber coating.

13. The apparatus according to claim 9 wherein said fishtail nozzle engages said laminate film to effect a downwardly dipping loop in a section of the laminate film underlying said fishtail nozzle.

14. The apparatus according to claim 13 wherein said first transport mechanism includes a first counter roller upstream of said downwardly dipping loop section of said laminate film and a second counter pressure roller downstream of said downwardly dipping loop section of said laminate film.

15. The apparatus according to claim 9 wherein said first transport mechanism includes transverse stretching rollers disposed between said feed roller and said heated laminating roller.

16. The apparatus according to claim 15 wherein said first transport mechanism includes a sheet tension measuring roller disposed upstream of said transverse stretching rollers, and drive system means, responsive to an output of said sheet tension measuring roller, for maintaining said laminate film under tensile stress between said take-off means and said feed roller.

17. The apparatus according to claim 15 wherein said first transport mechanism includes a sheet tension measuring means integrated with said transverse stretching rollers, and drive system means, responsive to an output of said sheet tension measuring means, for maintaining said laminate film under tensile stress between said take-off means and said feed roller.

18. The apparatus according to claim 9 wherein said first transport mechanism includes a transverse stretching roller disposed upstream of said take-off roller means.

19. The apparatus according to claim 18 further comprising a supply roll for holding a supply of said laminate film, and said first transport mechanism includes inclinable sheet guiding rollers disposed between said supply roll and said transverse stretching roller.

20. The apparatus according to claim 9 further comprising a supply roll for holding a supply of said laminate film, and said first transport mechanism includes inclinable sheet guiding rollers disposed upstream of said supply roll and downstream of said take-off roller means.

21. The apparatus according to claim 9 wherein said feed roller is driven synchronously with said take-off roller means.

22. The apparatus according to claim 9 wherein said feed roller leads said take-off roller means by 3 to 10%.

23. The apparatus according to claim 9 further comprising drive system means, interposed between said take-off roller means and said heated laminating roller, for effecting pre-adjustable sheet tensioning of said laminate film.

24. The apparatus according to claim 23 wherein said drive system means includes an AC servo motor for driving said take-off roller means.

25. The apparatus according to claim 23 wherein said drive system means includes overlapping gearing.

26. The apparatus according to claim 1 further comprising a support means underlying said laminate film at a position underlying said fishtail nozzle.

27. The apparatus according to claim 26 wherein said support means comprising a solid support with a flexible covering.

* * * * *